United States Patent [19]

Ohkami

[11] Patent Number: 5,446,862
[45] Date of Patent: Aug. 29, 1995

[54] SYSTEM AND METHOD FOR GRANTING OR PREVENTING ATOMIC OR NONATOMIC MEMORY ACCESS REQUESTS TO SHARED MEMORY REGIONS

[75] Inventor: Takahide Ohkami, Kanagawa, Japan

[73] Assignee: Mitsubishi Denki Kabushiki Kaisha, Tokyo, Japan

[21] Appl. No.: 160,363

[22] Filed: Nov. 29, 1993

Related U.S. Application Data

[63] Continuation of Ser. No. 630,300, Dec. 19, 1990, abandoned.

[30] Foreign Application Priority Data

Feb. 23, 1990 [JP]  Japan .................................. 2-43820

[51] Int. Cl.[6] ........................ G06F 12/00; G06F 13/00
[52] U.S. Cl. ..................................... 395/427; 395/650; 395/728; 364/DIG. 1; 364/DIG. 2; 364/241.2; 364/913.46; 364/941
[58] Field of Search ......................... 395/425, 650, 725; 364/200 MS File, 900 MS File, 241.2, 913.46, 941.6, 941.8

[56] References Cited

U.S. PATENT DOCUMENTS

| | | | |
|---|---|---|---|
| 3,710,324 | 1/1973 | Cohen et al. | 395/275 |
| 3,815,099 | 6/1974 | Cohen et al. | 395/325 |
| 4,412,303 | 10/1983 | Barnes et al. | 395/800 |
| 4,561,051 | 12/1985 | Rodman et al. | 395/425 |
| 4,574,350 | 3/1986 | Starr | 395/725 |
| 4,604,694 | 8/1986 | Hough | 395/650 |
| 4,604,743 | 8/1986 | Alexandru et al. | 370/85 |
| 4,644,496 | 2/1987 | Andrews | 395/800 |
| 4,736,317 | 4/1988 | Hu et al. | 395/325 |
| 4,805,106 | 2/1989 | Pfeifer | 395/650 |
| 4,969,088 | 11/1990 | McAuliffe et al. | 395/325 |
| 4,975,870 | 12/1990 | Knicely et al. | 395/425 |
| 5,075,842 | 12/1991 | Lai | 395/425 |
| 5,136,691 | 8/1992 | Baror | 395/200 |
| 5,136,714 | 8/1992 | Braudaway et al. | 395/725 |
| 5,142,676 | 8/1992 | Fried et al. | 395/425 |
| 5,163,143 | 11/1992 | Culley et al. | 395/425 |
| 5,175,829 | 12/1992 | Stumpf et al. | 395/375 |
| 5,175,837 | 12/1992 | Arnold et al. | 395/425 |
| 5,261,106 | 11/1993 | Lentz et al. | 395/725 |

FOREIGN PATENT DOCUMENTS

| | | |
|---|---|---|
| 0312866 | 10/1988 | European Pat. Off. . |
| 0297895 | 1/1989 | European Pat. Off. . |
| 0343640 | 11/1989 | European Pat. Off. . |
| 0351556 | 1/1990 | European Pat. Off. . |
| 86/02475 | 10/1985 | WIPO . |

OTHER PUBLICATIONS

"Computer Architecture and Parallel Processing", pp. 557–577, Kwai Hwang (McGraw-Hill Book Company, 1984).

"Synchronization, Coherence, and Event Ordering in Multiprocessors", Faye Briggs, pp. 9–21, IEEE Computer, vol. 21, No. 2, Feb. 1988.

*Primary Examiner*—Glenn Gossage
*Assistant Examiner*—Frank J. Asta
*Attorney, Agent, or Firm*—Wolf, Greenfield & Sacks

[57] ABSTRACT

A memory access system using a machine instruction architecture having separate machine instructions to instruct a start of the atomic memory access and an end of the atomic memory access, respectively, comprises an atomic memory access memory array for storing a start/end of the atomic memory access, an object memory region indicative of information of an access request and an identifier of a subject of the access request. The system can detect the fact that a memory access request with discrepant identifiers has been newly issued for the object memory region to which the atomic memory access is being effected at present and can immediately initiate a processing routine corresponding thereto. The system may also record a memory access history of the new memory request, whether or not the new memory access has been granted, and can continue or suspend an exclusive memory access request currently being executed.

6 Claims, 9 Drawing Sheets

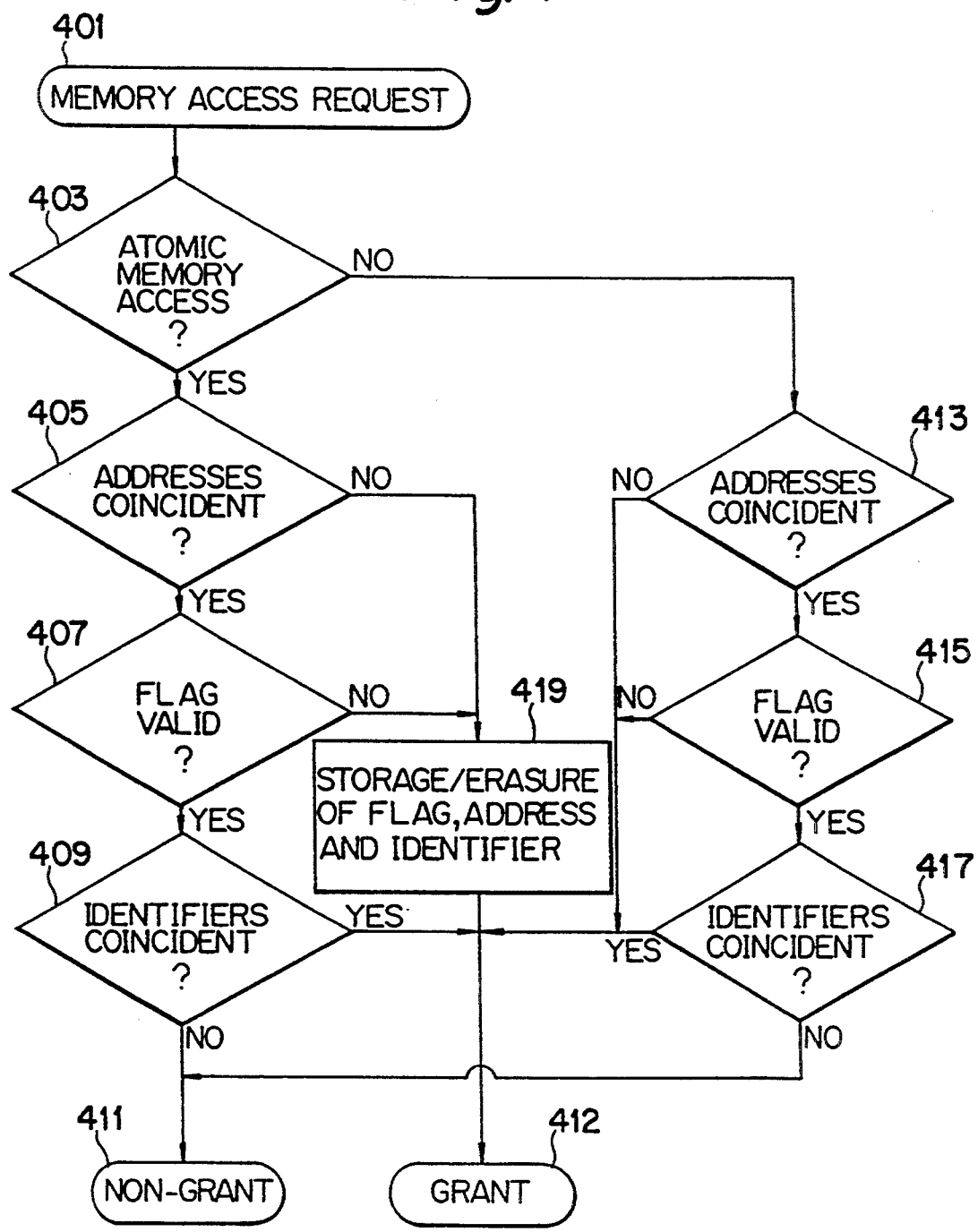

Fig.5(a)

| CYCL | 1 | 2 | 3 | 4 | 5 |
|---|---|---|---|---|---|
| MBC | R-300 | | | | W-200 |
| GRNT | OK-0 | | | | OK-0 |
| MB | BUSY | | | BUSY | BUSY |
| P0 | R-300 | WAIT | WAIT | READ | W-200 |

Fig.5(b)

| CYCL | 1 | 2 | 3 | 4 | 5 | 6 | 7 | 8 | 9 | 10 | 11 |
|---|---|---|---|---|---|---|---|---|---|---|---|
| MBC | R-500 | | | | W-500 | R-501 | W-502 | R-503 | | | |
| GRNT | OK-1 | | | | OK-1 | OK-2 | OK-0 | OK-3 | | | |
| MB | BUSY | | | BUSY | BUSY | BUSY | BUSY | BUSY | BUSY | | BUSY |
| P0 | | | | W-502 | W-500 | | W-502 | | | | |
| P1 | R-500 | WAIT | WAIT | READ | | | WAIT | WAIT | WAIT | WAIT | READ |
| P2 | | | R-501 | WAIT | WAIT | R-501 | WAIT | WAIT | READ | | |
| P3 | | | | | R-503 | WAIT | WAIT | R-503 | WAIT | WAIT | |

Fig.6 (a)

[1] LOAD ID DR ; Load data of DR into IDR (store ID at the time of memory request)

[2] STORE ID DR ; Save data IDR in DR

[3] LOAD AR DR ; Load data of memory indicated by AR into DR

[4] STORE AR DR; Store DR data of memory indicated by AR

[5] LOCK AR ; Lock memory indicated by AR using ID of IDR

[6] UNLOCK AR ; Unlock memory indicated by AR using ID of IDR (AR: address register, DR: data register, IDR: memory request ID register)

Fig.6 (b)

[Step 1] STORE IDR D0 ; Save data of IDR in D0

[Step 2] LOAD IDR D1 ; Load data of d1 into IDR

[Step 3] LOCK A1 ; Lock memory of A1

[processing while memory of A1 is locked]

[Step 4] UNLOCK A1 ; Unlock memory of A1

[Step 5] LOCK IDR D1 ; Restore saved IDR data

Fig. 7(a)

```
var Lock_Table: Array [1..10] of lock; (*lock array*)
procedure Memory_Lock(n);
begin
    (*Lock  Lock_Table[n]*)
end;
procedure Memory_Unlock(n);
begin
    (*Unlock Lock_Table[n]*)
end;
```

Fig. 7(b)

```
Procedure Example(n);
bigin
    Memory_Lock;
    (*Processing while locking Lock_Table[n]*)
    Memory_Unlock(n);
end;
```

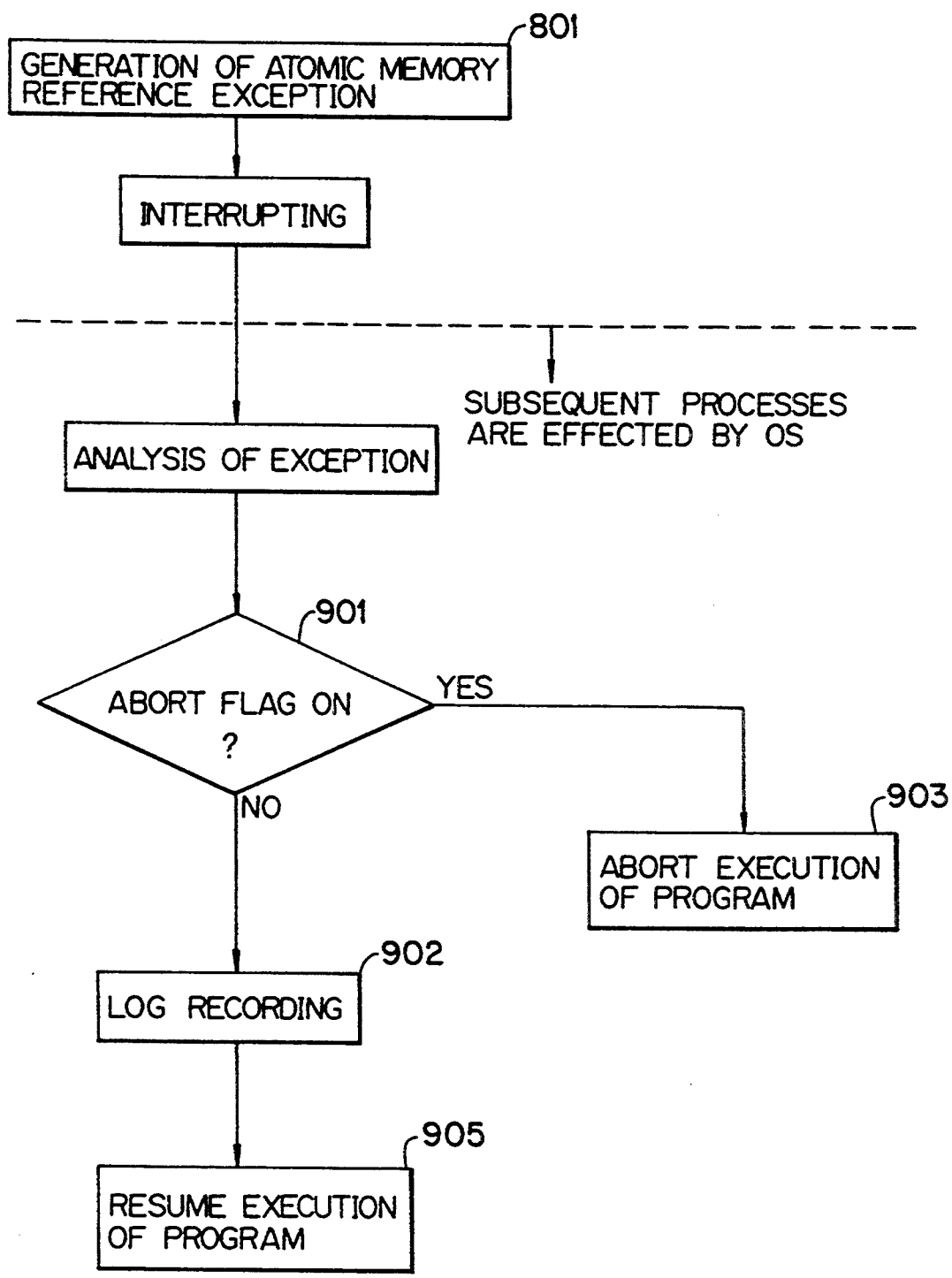

SYSTEM AND METHOD FOR GRANTING OR PREVENTING ATOMIC OR NONATOMIC MEMORY ACCESS REQUESTS TO SHARED MEMORY REGIONS

This application is a continuation of application Ser. No. 07/630,300, filed Dec. 19, 1990, now abandoned.

BACKGROUND OF THE INVENTION

1. Field of the Invention

The present invention relates to a memory access method and system in a computer system constructed of a plurality of processors or a plurality of processor equivalent circuits.

2. Description of the Prior Art

When a multiprocessor system having a shared memory or a parallel processing system executes a series of data processes, interruption of other data processing operations during the former data processing in some cases causes problems. A synchronous operation may also be required, wherein the respective processors process the data assigned thereto, and total processing is effected after the processed results thereof have all been obtained.

For this reason, a multiprocessor system having a shared memory needs an "atomic" memory access function. This function performs an exclusive operation which does not permit memory accessing from other programs during a reading sequence or writing a series of data with respect to the data processing in a shared memory region.

Operations such as reading from and writing into the memory are herein referred to as a memory access. A memory access sequence in which a series of operations are undividable by other programs or processors is called an "atomic" memory access.

This atomic memory access function has hitherto been attainable by a read-modify-write function of the memory in a special case where the write operation is effected subsequently to the read operation.

As reported in, e.g., "Interprocess Communication Mechanisms", Paragraph 8.1, of "Computer Architecture and Parallel Processing" written by K. Hwang & F. A. Briggs (McGraw-Hill Book Company, 1984), that is a well-known technique.

The read-modify-write function of the memory is a function by which the data is read from a specified address at each of continuous memory cycles, the data is subsequently written to the same address, and meanwhile a memory reference from other addresses is inhibited. These functional operations of the memory are attainable by utilizing a read-modify-write function incorporated into 256KB DRAM CHIP MSM4256 proposed in, e.g., ['88 Mitsubishi Semiconductor Data Book: Memory] edited by Mitsubishi Electric Co., Ltd.

When actualizing the atomic memory access function by use of the read-modify-write function, it is required that a memory bus be dedicatedly used to enable a processor to execute the read-modify-write operation to exclusively effect the memory access. In this manner, the atomic memory access can be fulfilled by inhibiting the interruption and execution of memory accessing by other processors.

This kind of hardware operation will now be discussed in terms of a program or micro machine instruction.

As stated in "Synchronization, Coherence, and Event Ordering in Multiprocessors" (IEEE Computer, Vol. 21, No. 2, February 1988, pp. 9–21) written by F. A. Briggs, the machine instruction includes a Test & Set instruction and/or a Compare & Swap instruction. Both of them are instructions to exclusively access a region in the memory.

The Test & Set instruction exclusively executes the following operation as an inseparable one:

Test & Set (x)
{temp←x; x←1; return temp;}

On the other hand, the Compare & Swap instruction exclusively executes the following operation as an inseparable one:

Compare & Swap (r1, r2, w)
{temp←w; if (temp=r1)
then {w←r2; z←1}
else {r1←temp; z←0}} where z is the flag variable. z is set to 0 or 1 in accordance with the comparative results.

A set of these instructions are employed for securing and releasing the occupation by use of a lock variable provided corresponding to an inter-program shared resource. For instance, the lock is set to such a lock variable. If lock=0, it is assumed that a resource R corresponding to the lock is not secured from any program. If lock=1, the assumption is that the resource R is secured in any one of programs. When a certain program P now secures the resource R, the following operation is at first carried out.

$$y = \text{Test \& Set (lock)}$$

A previous value of the lock is stored in the variable y. Hence, an examination of this makes it possible to know whether the lock value is 0 or 1 before the execution of the Test & Set instruction. If the value is 0, it implies that the corresponding resource R is free, and then lock=1 by the Test & Set instruction. It follows that an authorization of use about the resource R is obtained in a program P. If y is 1, the resource R is secured by a program other than P. The program P repeats the Test & Set instruction till the resource R is released.

The operations discussed above have been explained in association with the Test & Set instruction. The compare & Swap instruction is usable for the same operations.

The Test & Set instruction is, as described above, employed for securing the occupation by handling the lock variable corresponding to the resource. In general, there is no special instruction to release the lock variable to make the resource open after the use of resource has been terminated. Based on the example given above, lock←0, i.e., 0 may simply be stored in the lock, and hence an ordinary store instruction is used.

The operation is the same with the Compare & Swap instruction.

Note that in the Test & Set instruction and the Compare & Swap instruction which are employed for the atomic memory access, data read and data write subsequent thereto are performed as a series of exclusive operations, and in the meantime other memory accesses are not permissible.

The read-modify-write function has been employed to effect the atomic memory access in the prior art multiprocessor system. When one processor performs the read-modify-write function, a memory bus for connecting the processor to the memory is occupied. Other processors have to wait till the atomic memory access is finished even in the case of a memory access to a region different from an object region of the atomic memory access. As a result, the processing time is delayed. This is the first problem.

In the prior art, the atomic memory access is feasible with respect to only the read and the write subsequent thereto. The atomic access can not be done during an arbitrary read/write sequence.

Disclosed in Japanese Patent Laid-Open No. 59-116866 is a technique by which the atomic memory access is managed per address, and the memory access to a different memory region can be executed.

Considering that the atomic memory access is also required for a synchronous operation between the multiple processors, however, it is insufficient to simply permit the memory accesses to the different regions from a plurality of processors. Namely, there exists a possibility of a data destruction or system runaway unless an appropriate execution of the memory access per process or program is assured.

The following is a description of the second problem. In the case of a machine instruction architecture, the conventional Test & Set instruction and/or the Compare & Swap instruction are available for starting the atomic memory access. No special instruction is, however, provided for terminating the atomic memory access. Instead, an ordinary Store instruction or an instruction corresponding thereto is employed. Under such circumstances, the former is confused with other data Store instructions. This in turn induces a mistake in programming.

The third problem will hereinafter be explained. The conventional systems did not presume parallel accessing of the memory. Therefore, the Test & Set instruction and the Compare & Swap instruction merely protect a series of operations, viz., the object memory regions at that time. The management for correctness of a subsequent program or other programs simultaneously executed was not taken into consideration. Consequently, there is a possibility that the data or system may be destroyed by an incorrect program. Reliability is thereby caused to deteriorate.

Coping with the first through third problems, this invention aims at reducing time for the complete memory accesses while assuring the conventionally unconsidered correctness of the program or of the system operation.

SUMMARY OF THE INVENTION

A memory access system according to the present invention comprises an atomic memory access memory array for atomic memory accessing defined as an exclusive operation in which a sequence of reading or writing a series of data is undividable by other memory accessing. Stored in this atomic memory access memory array are a start/end of the atomic memory access, object memory region indicative information of an access request and an identifier of a subject of the access request. There is prepared a means for generating combinatory signals thereof.

In the machine instruction architecture associated with the atomic memory access, there are separately provided a machine instruction to instruct a start of the atomic memory access and a machine instruction to instruct an end of the atomic memory access.

There are provided a means for detecting the fact that a memory access request with discrepant identifiers has been newly issued for the object memory region to which the atomic memory access is being effected at present and a means for starting a processing routine corresponding thereto.

In accordance with this invention, when a certain processor gives the atomic memory access request, this request is discriminatingly stored. Based on this storage, the control is effected to permit or reject a subsequent memory access to the same object region.

In the instructions associated with the atomic memory access, the dedicated machine instructions indicating the start and end are provided. The atomic memory access is attainable by the dedicated machine instructions. The discrimination in programming is made clear.

Besides, if an incorrect memory access request is issued for the memory region to which the atomic memory access is performed at present, this is detected, and processing thereof is carried out.

BRIEF DESCRIPTION OF THE DRAWINGS

Other objects and advantages of the present invention will become apparent during the following discussion taken in conjunction with accompanying drawings, in which:

FIG. 4 is a flowchart showing a processing routing for memory accessing;

FIGS. 6($a$) and 6($b$) are charts showing machine instructions and a part of a program based on these instructions;

FIGS. 7($a$) and 7($b$) are charts showing procedures described by a high-order programming language;

FIG. 9 is a flowchart showing a flow of an atomic memory access exception interrupt.

Note that in the Figures the same or corresponding components are marked with the like symbols.

DETAILED DESCRIPTION OF THE DRAWINGS

Preferred embodiments of the present invention will hereinafter be described with reference to the accompanying drawings.

Figure 2A:
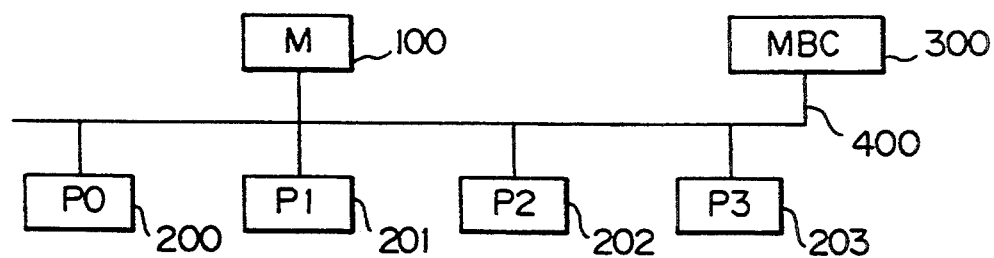
FIGS. 2($a$) and 2($b$) is a diagram showing a construction of a multiprocessor system.
Figure 2B:
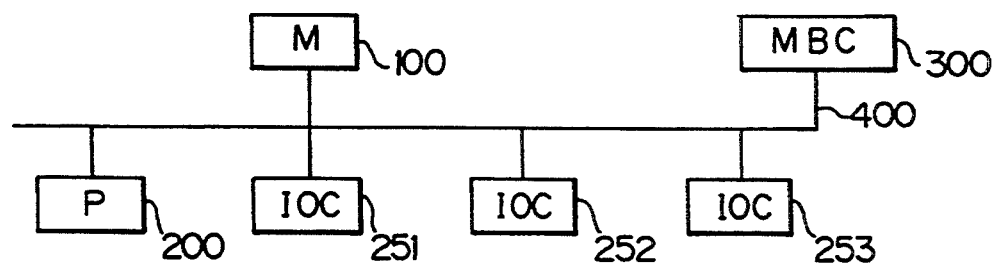

FIG. 2 is a diagram illustrating a construction of a multiprocessor system (a) or a single processor system (b). Connected to a memory bus 400 in the examples (a) and (b) are a memory or memory blank 100, processors 200–203, I/O control units 251–253 and a memory bus control mechanism (MBC) 300. In the system shown in FIG. 2($a$), the four processors 200–203 access the memory 100 via the memory bus 400. At this time, the memory bus is controlled by the MBC 300.

Figure 3:
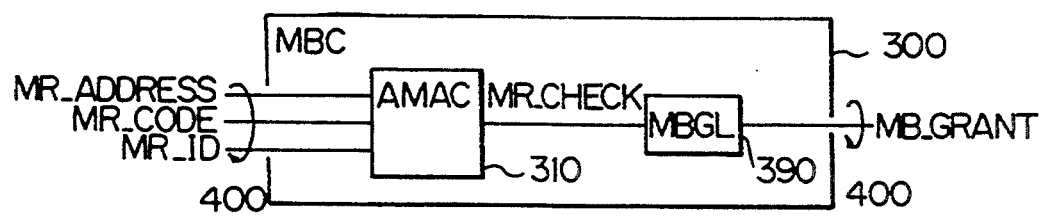
FIG. 3 is a diagram depicting a memory bus control mechanism.

FIG. 3 depicts an interior of the MBC 300 composed of an atomic memory access control mechanism (AMAC) 310 and a memory bus grant logic (MBGL) 390. FIG. 3 illustrates only a portion associated with this invention, and other mechanisms/logics needed for the bus control are omitted for simplifying the description. Input to AMAC 310 are an object address (MR_ADDRESS) of a memory access request, a code (MR—CODE) indicating the type of memory access request and a subject identifier (MR—ID) of the memory access request. In accordance with the signals thereof, AMAC 310 outputs a memory access request check signal (MR—CHECK). To be specific, the identifier (MR—ID) is defined as a processor number or a program corresponding number. The memory access request check signal (MR—CHECK) is a resultant signal after checking whether or not the present memory access request indicated by MR—ADDRESS, MR—CODE and MR—ID is a memory access request consistent with an atomic memory access region. The signal MR—CHECK is input to MBGL 390. MBGL 390 outputs a final memory bus grant signal (MB—GRANT) on the basis of MR—CHECK and other internal status of the memory bus control mechanism 300.

Figure 1:
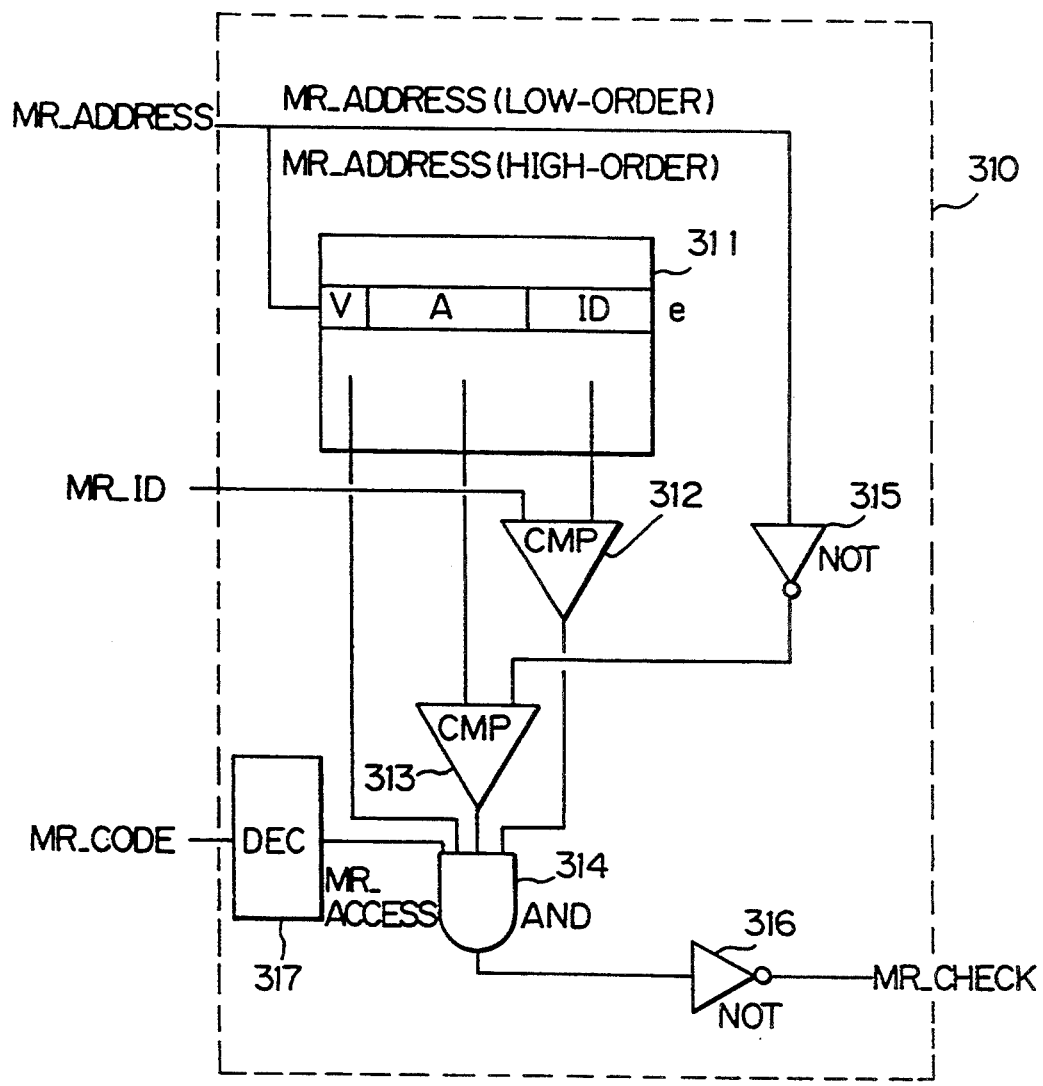
FIG. 1 is a diagram depicting an atomic memory access control mechanism.

FIG. 1 illustrates an interior, i.e., the most significant construction of this invention, of AMAC 310 shown in FIG. 3. Referring to FIG. 1, the numeral 311 represents an exclusive memory access memory array (AA); 312-313 comparators; 314 a logic AND circuit; and 315-316 logic NOT circuits. The memory array AA 311 is conceived as a memory having a plurality of entries consisting of 3 fields V, A and ID. One atomic memory access object region corresponds to one entry. The V-field of each entry is a flag indicating a validity/invalidity of the entry. The A-field is a field for holding a low-order bit of a memory address. The ID-field is a field for identifying the memory access request. The entry of AA 311 is specified by a high-order portion of MR—ADDRESS. The comparator 313 compares the content of the A-field of that entry with the low-order bits of MR—ADDRESS. The comparator 313 judges whether or not the memory address indicated by that entry is coincident with a memory access request address. Simultaneously, the comparator 312 compares the identifier (MR—ID) of the memory access request with the content of the ID-field. Note that MR—ACCESS is defined as a signal obtained by decoding the code (MR—CODE), shown in FIG. 3, of the memory access request, the signal indicating a presence of the access request to the memory. An output of the check signal (MR—CHECK) indicates a grant/non-grant state, shown in the following table, for the use of the memory bus in accordance with field contents of AA and the comparative results.

| Valid/Invalid Flag | Memory Address | Memory Access Request Identifier | Check Signal |
|---|---|---|---|
| invalid | — | — | grant |
| valid | discordance | — | grant |
| valid | accordance | discordance | non-grant |
| valid | accordance | accordance | grant |

The following is a description of the operations of the memory access request in the thus constructed atomic memory access control mechanism AMAC 310.

Referring to FIG. 2 when a program PROG1 executed by a certain processor e.g. 200 initiates an atomic access to an address A of memory 100, a V-flag of an entry E of AA 311 which is indicated by a high-order bit becomes valid. A low-order bit Al of the address A is stored in the A-field. An identifier ID1 of this memory access request is stored in the ID-field. Upon an end of the atomic memory access, the V-flag becomes invalid.

Supposing that another program PROG2 requested by another processor e.g. 201, issues an access request to the memory address A, an identifier ID2 of a memory reference request is compared with ID1 previously stored in the ID-field. If different, the access is not granted.

In this manner, it is possible not only to simply permit the reference to the different memory address by another processor to thereby increase a bus occupying efficiency but also to secure a logically consistent operation via the prevention of access to the same memory location thereby increasing the processing efficiency to thereby enhance the reliability.

To maintain a correct sequence while performing the parallel operation, the atomic memory access has to be exclusive and complete.

The operations given above will hereinafter be summarized with reference to the table shown above.

(a) The processor issues the atomic memory access request. In this case, the access request is granted, if an atomic memory access request to the object address has not yet been set in the exclusive memory access memory array (AA). This address and the identifier are stored in the atomic memory access memory array.

(b) The processor issues an atomic or non-atomic memory access request. In this case, the access request is granted, if this address is discrepant from an address already set in AA.

(c) The processor issues the atomic memory access request. In a case where the atomic memory access request has already been set in AA, the identifiers are compared. If these identifiers are coincident with each other, the access request is granted.

(d) The processor issues the atomic memory access request. In a case where the atomic memory access request has already been set in AA, the identifiers are compared. If these identifiers are discrepant, the access request is rejected.

Referring to FIG. 4, this is a flow diagram of the table given above. Upon a memory access request (Step 401) by one of a plurality of processors, a decision (Step 403) is made as to whether the memory access request is an atomic memory access request. If the request is an atomic memory access request (Step 403 YES), the address of the atomic memory access request is compared (Step 405) with an existing atomic memory access request currently being executed. Where the address of the atomic memory access request is coincident (Step 405 Yes) with the existing memory access request being executed, the validity flag of entry (with the existing memory access request being executed) is checked (Step 407). Where the validity flag indicates the valid state (Step 407 YES), the identifier field of the atomic memory access request is compared (Step 409) with the identifier field of the coincident address atomic memory access request currently being executed. In the case where the identifiers fields are not the same (Step 409 NO), the memory access request is denied (Step 411). However, for the case where the identifier fields are coincident (Step 409 YES), the atomic memory access request is granted (Step 412).

The same denial (Step 411) of a memory access request can also result where the memory access request is not an atomic memory access request (Step 403 NO). In this instance, the address of the non-atomic memory access request is compared (Step 413) with the address of the atomic memory access request currently in execution. If the addresses are the same (Step 413 YES), the validity flag of the non-atomic memory access request is checked (Step 415). In the case where the validity flag of the entry indicates the valid state (Step 415 YES), the identifier field of the non-atomic memory access request is compared (Step 417) with the identifier field of the atomic memory access request currently in execution. Where the identifiers are not the same (Step 417 NO), the non-atomic memory access request is denied (Step 411).

In all other cases, the memory access request is granted. For example, an atomic memory access request where the addresses are not coincident (Step 405 NO), an atomic memory access request where the addresses are coincident but the validity flag of the atomic memory access request is not valid (Step 407 NO), and an atomic memory access request with a coincident (Step 409 Yes). The granting of a memory access request can also occur for a non-atomic memory access request where the addresses are not coincident (Step 413 NO), a non-atomic memory access request where the address is coincident but the validity flag is not valid (Step 415 NO), and a non-atomic memory access request where the addresses are coincident and the validity flag is valid, and the identifier fields are coincident (Step 417 YES).

Figure 5C:
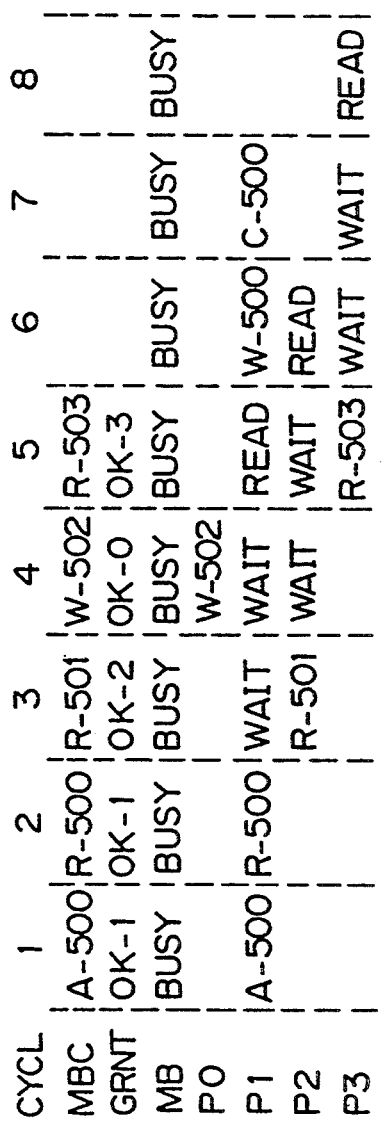
FIGS. 5($a$), 5($b$) and 5($c$) are timing charts showing timings for a memory reference.

Based on the construction discussed above, there will be given an explanation of how memory accessing is reduced. FIG. 5(a) shows basic operation timings of the ordinary memory access (read and write). In this example, the read operation is finished at four cycles, while the write operation is finished at one cycle. FIG. 5(b) shows an example of operation timings of the conventional memory access. The memory bus is occupied during the process per processor, the process being effected in series. FIG. 5(c) shows an example of operation timings according to the present invention. The operation will be described in greater detail. Referring to FIG. 5(c), the symbol Cycl represents an operation timing. MBC indicates an operation instruction of the bus control mechanism to the memory. Grnt designates a signal imparted to the processor by MBC. MB denotes an occupied state of the memory bus. P0–P3 represent operations of the processor.

The symbol R-XXX designates a request for reading from a memory address; and W-XXX is a request for writing to the memory address XXX. Turning back to FIG. 5(a), a processor P0 gives a read request from an address 300 at a cycle 1, and the data comes back from the memory at a cycle 4. Hence, the reading operation of the memory, though not associated with this invention, needs 4 cycles. The writing operation comes to an end at 1 cycle. In FIG. 5(a), W-200 is present at a cycle 5. In the processor P0, the write operation is finished at this cycle. In fact, however, the operation of the memory, though not associated with this invention either, continues after 3 cycles. The symbol Cycl represents a cycle of the memory bus. MBC denotes a memory request by the memory bus control mechanism. Grnt designates a grant/non-grant (MB_GRANT) for the memory bus. The symbol OK_n indicates a grant signal for the memory bus with respect to a processor Pn. MB represents a memory bus occupying state. Busy indicates that the bus is occupied. Pn represents a memory reference request of the processor Pn. Incidentally, an assumption in this explanation is that the memory is divided into 4 banks, and XXX mod 4 is capable of independently processing the requests of 0, 1, 2 and 3 with respect to each memory address XXX. As a matter of course, an arbitrary address may be taken on the assumption that one memory is provided.

FIG. 5(b) shows a conventional example of the operation based on this. Referring to FIG. 5(b), R-500 and W-500 subsequent thereto are atomic memory accesses. The memory accesses (R-501, W-502, R-503) are processed after finishing the above-described atomic accesses.

FIG. 5(c) illustrates an operational example according to the present invention. This example corresponds to that of FIG. 5(b). In FIG. 5(c), A-XXX indicates a start of the atomic access to the memory address XXX, while C-XXX indicates an end of the atomic access to the memory address XXX. Referring to the same Figure, the processor P1 initiates the atomic memory access to the memory address 500 and terminates this access at a cycle 7. In the meantime, the processor P1 issues a read request at a cycle 2 and write request at a cycle 6. These accesses are affirmed as the atomic accesses. While the processor P1 is executing the atomic memory access, the processor P0 carries out the write at a cycle 4; the processor P2 effects the read at a cycle 3; and the processor P3 performs the read at a cycle 5, respectively. These accesses are practicable because of the memory banks being different. In the prior art, however, even when the memory banks are different, it is required that the memory bus be locked while the one processor is performing the atomic memory access. There must be a waiting period till the atomic memory access has been finished. By utilization of this invention, the memory access is, as shown in FIG. 5(c), made more efficient.

In FIG. 5, the start and end of the atomic memory access are explicitly carried out by A-XXX and C-XXX. As an attribute of R-XXX (read) or W-XXX (write), however, the start and end of the atomic memory access are specified. R-XXX or W-XXX is, it can be considered, combined with A-XXX or C-XXX. For instance, A & R-XXX serves to specify the start of the read operation from the memory address XXX and of the atomic memory access to this address XXX. Similarly, A & W-XXX specifies the start of the write and of the memory access. C & R-XXX serves to specify the end of the read operation from the memory address XXX and of the atomic memory access to the same address. C & W-XXX is likewise capable of specifying the end of the write operation and of the atomic memory access.

Based on the premise of the construction described above, there will be given a description about how the instructions at the time of programming work specifically. On the occasion of a support for atomic memory accessing by the memory bus control mechanism of FIG. 1, there are provided a machine instruction for indicating the start of the atomic memory access and a machine instruction for indicating the end thereof. FIG. 6 shows an embodiment wherein an arbitrary machine instruction is usable between those two machine instructions.

FIG. 6(a) is a chart for explaining an explicit machine instruction language of this invention. A machine instruction, provided by a processor, LOADID serves to load the data stored in a data register DR into a special purpose register IDR for holding a memory access request ID employed when providing the memory with an access request. A machine instruction STOREID works to SAVE the ID stored in the IDR register by entering it into a data register DR. A machine instruction LOAD functions to load the data existing in the memory address register AR into the data register DR. A machine instruction STORE serves to store the data stored in the data register, into the memory address register AR. A machine instruction LOCK indicates the start of the atomic memory access to the memory address held in memory address register AR. A machine instruction UNLOCK indicates the end of the atomic memory access to the memory address held in register AR. For the memory access request concomitant with the instructions LOAD and STORE, the data stored in the IDR register is used as a memory access request ID.

FIG. 6(b) shows an example of an atomic memory reference program employing the basic machine instruction language described above.

According to the program of FIG. 6(b), the memory access request ID stored in register IDR is saved ((Step 1). After loading a new memory access request ID into register IDR (Step 2), the atomic memory access is initiated (Step 3). Required processing comes to an end (Step 4). Thereafter, the atomic memory access is finished. The saved memory access request ID is restored (Step 5). With this arrangement, it can be understood from the lock-instruction and unlock-instruction that the atomic memory access is explicitly being effected on the program. As a result, programming efficiency can be improved and programming errors can be reduced.

In the examples shown in FIG. 6(b), the LOCK instruction (Step 3) and UNLOCK instruction (Step 4) are used in the following form.

Lock Instruction: LOCK AR
Unlock instruction: UNLOCK AR

The lock-instruction has a function to lock the memory address stored in the register AR. This function is easily attainable by use of the aforementioned atomic memory access control mechanism. The memory address stored in the register AR is sent to the atomic memory access control mechanism by executing the lock-instruction. The memory address is, after performing a variety of checks, registered in the exclusive memory access memory array. During storage of the address in the exclusive memory access memory array, it follows that a position of that memory is locked. In the unlock-instruction, the address stored in this memory array is erased, and the memory is unlocked. Incidentally, in the lock-instruction and unlock-instruction, it is assumed that the data corresponding to ID of the exclusive memory access memory array is stored in a specially provided register IDR. As discussed above, the lock-instruction and unlock-instruction can easily be actualized as machine instructions by utilizing the foregoing atomic memory access control mechanism.

FIG. 7 shows an example of locking/unlocking the memory by a high-order programming language (Pascal language) on the premise of the above-described machine instructions. A lock array (Lock_Table) is provided on the memory. Lock_Table specified by n is locked/unlocked with procedures Memory_Lock (n) and Memory_Unlock (n). FIG. 7 also shows an example of a program which utilizes the above-mentioned.

The lock array (Lock_Table) is available for the memory for holding a lock variable corresponding to a resource managed by, e.g., an OS. In this case, supposing that the lock variable for a disk unit #7 is indicated by, e.g., a Lock_Table [7], locking is effected by Memory_Lock (7) when a certain program uses the disk unit #7. When releasing the completely used disk unit #7, unlocking is performed by memory_Unlock (7). This program performs an access to the disk unit #7 between Memory_Lock (7) and Memory_Unlock (7).

The procedure Memory_Lock (n) uses the machine instruction "lock". The procedure Memory_Unlock (n) can readily be actualized by use of the machine instruction "unlock". In accordance with the specification of the machine instructions "lock" and "unlock", during the atomic memory access based thereon, other memory access can simultaneously be carried out. This improves efficiency in terms of developing programs for the multiprocessor.

Next, a function to affirm consistency of the program and correctness of its operation will be explained. There is herein given one embodiment of a mechanism for detecting an exception of the atomic memory access, generating an interrupt correspondingly and actuating a corresponding processing routine.

The exception condition causing the processor interrupt which inhibits access to the same location as the currently executed of the atomic memory access is detectable by the memory bus control mechanism 300 depicted in FIG. 3. The exception condition is detected in the case of the issuing of an access request with a different memory access request ID to, e.g., a memory address 400 currently undergoing an atomic memory access to this address 400. This implies that no memory access is granted (the memory access request ID is different) where a processor executes a non-atomic access to a memory region currently executing the atomic memory access. This situation may be handled as, for instance, an abnormal exception. In the great majority of cases, such a measure is rather desirable. The reason for this is elucidated as follows. Typically in parallel programming, where the simultaneously functioning programs perform accesses to the same memory region, it is a common practice to effect the atomic memory access. An execution of the non-atomic memory access is in most cases associated with a programming error.

The memory access exception detected by the memory bus control mechanism can be handled in the same manner with other memory access exceptions. For this reason, no special interrupt mechanism is required. One factor for the memory access exception is added, and this may simply be supported by the hardware. As a matter of course, a dedicated interrupt mechanism may also be provided.

This exception interrupting process is attainable by utilizing a conventional well-known method and mechanism.

Figure 8:
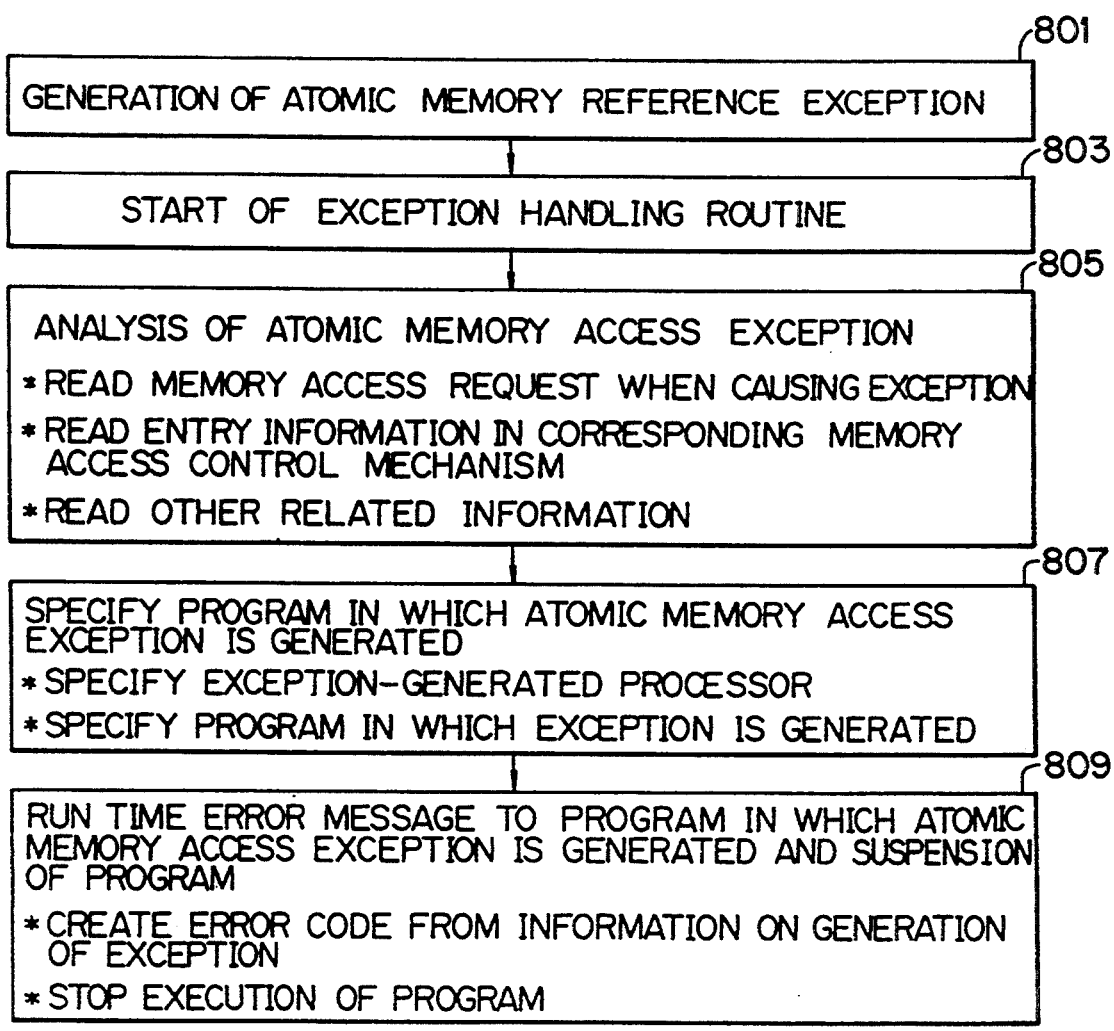
FIG. 8 is a flow chart showing a flow of exception handling.

Turning to FIG. 8, there is shown an example of exception handling when causing an atomic memory access exception interrupt. Referring to FIG. 8, concomitantly with an occurrence of the atomic memory access exception, an exception handling routine for the memory access exception is started (Step 803) by a hardware mechanism. The atomic memory access exception is recognized therein, and analysis thereof is made (Step 805). A program which causes this exception is specified (Step 807). After giving an error message to this program, this program is suspended (Step 809). In the analysis of the atomic memory access exception (Step 805), with support from the hardware mechanism, a state of occurrence of the exception is known by reading a type of the memory access request when causing the exception, a memory access identifier and corresponding entry information of the exclusive memory access memory array in the atomic memory access control mechanism.

Specifying the program which causes the exception (Step 807) involves the steps of knowing the memory access identifier from a state where the exception is caused and specifying the program with reference to a variety of program management tables on the basis of the memory access identifier.

The program which causes the exception is unable to continue the process (Step 809). Hence, a code corresponding to the error generated is set, and the execution of the program is suspended.

In the exception handling described above, if the atomic memory access exception interrupt takes place, the execution of program is suspended (Step 809). In the case of debugging the program, however, even if atomic memory access exception interrupt occurs, it is desired in some cases that the program be continued without suspension. Referring to FIG. 9, a flag (abort flag Step 901) of the software is provided inwardly of the OS. On the occasion of the atomic memory access exception interrupt (Step 801), when the abort flag is ON (Step 901 Yes), the control is effected to eventually suspend the execution of program (Step 903). When the flag is OFF (Step 901 No), the control is performed to eventually continue the execution of the program (Step 905).

When the abort flag is OFF(Step 901 No), the OS takes a record (Step 907) of the atomic memory access exception to provide an analyzable state after finishing the execution of program. A log region is secured in the memory region managed by the OS. The record is put in this log region. Thus, the record of exception can readily be fulfilled. FIG. 9 shows a simple exception handling flow.

As discussed above, the present invention exhibits the following advantages. The memory access addresses and identifiers are stored in the exclusive memory access memory array, thereby improving the memory access efficiency while keeping the logical validity.

The separate instruction is given between the start of the atomic memory access and the end thereof. During this period, other arbitrary instructions can be executed without causing any confusion. Besides, programming is facilitated, thereby improving the reliability on the program.

Moreover, there is detected an illegal memory access to the memory region to which the atomic memory access is being effected. The atomic memory region is thus protected. As a result, the reliability of the system is ameliorated due to interrupt processing.

Although the embodiments of this invention have been described in detail with reference to the accompanying drawings, it is to be understood that the present invention is not limited to those embodiments. Various changes or modifications may be effected therein by one skilled in the art without departing from the scope or spirit of the invention.

What is claimed is:

1. A data processing system including:
   a plurality of processors;
   a shared memory;
   a memory bus connected to said plurality of processors and connected to said shared memory; and
   a memory access system connected to the memory bus, including:
      a memory access memory array having an identifier field stored therein, wherein the identifier field is for identifying a process being executed on any of the plurality of processors, said memory access memory array corresponding to an address in said shared memory for which an exclusive memory access request is currently being executed;
      an interrupt mechanism for detecting a new memory access request, of a process being executed on any of the plurality of processors, having an identifier field different from the identifier field already stored in the memory access memory array; and
      a means for immediately initiating a processing routine upon the detection of the new memory access request.

2. A data processing system including:
   a plurality of processors;
   a shared memory;
   a memory bus connected to said plurality of processors and connected to said shared memory; and
   a memory access system connected to the memory bus, including:
      a memory access memory array having an identifier field stored therein, wherein the identifier field is for identifying a process being executed on any of the plurality of processors, said memory access memory array corresponding to an address in said shared memory for which an exclusive memory access request is currently being executed;
      an interrupt mechanism for detecting a new memory access request of a process being executed on any of the plurality of processors, having an identifier field different from the identifier field already stored in the memory access memory array; and
      a means for recording a memory access history of the new memory access request, whether or not the new memory access request is granted, and for continuing the exclusive memory access request currently being executed.

3. A data processing system including:
   a plurality of processors;
   a shared memory;
   a memory bus connected to said plurality of processors and connected to said shared memory; and
   a memory access system connected to the memory bus, including:
      a memory access memory array having an identifier field stored therein, wherein the identifier field is for identifying a process being executed on any of the plurality of processors, said memory access memory array corresponding to an address in said shared memory for which an exclusive memory access request is currently being executed;
      an interrupt mechanism for detecting a new memory access request having an identifier field, of a process being executed on any of the plurality of processors, different from the identifier field already stored in the memory access memory array; and
      a means for recording a memory access history of the new memory access request and a means for suspending of the exclusive memory access request currently being executed.

4. A data processing system comprising:
   a plurality of processors;

a shared memory;

a memory bus connected to said plurality of processors and connected to said shared memory;

wherein each of the plurality of processors may make memory access requests to addresses signifying regions of the shared memory, and said memory access requests including exclusive memory access requests which are non-interruptible by any other memory access request;

a memory access system connected to the memory bus, including, a memory access memory array for storing at least a validity field, low-order bits of a memory address, and a field for identifying a process making a memory access request, the process being executed on any of the plurality of processors;

an interrupt mechanism for detecting a new memory access request having an identifier field different from any identifier field already stored in the memory access memory array; and a means for immediately initiating a processing routine upon detection of the new memory access request.

5. A data processing system as claimed in claim 4, further comprising a means for recording a memory access history of the new memory access request upon the detection of said new memory access request, whether or not the new memory access request is granted, and a means for continuing the exclusive memory access request currently being executed.

6. A data processing system as claimed in claim 4, further comprising a means for recording a memory access history of the new memory access request upon detection of said memory access request and a means for suspending the exclusive memory access request currently being executed.

* * * * *